United States Patent
Mai et al.

(10) Patent No.: US 6,515,986 B1
(45) Date of Patent: Feb. 4, 2003

(54) METHOD AND APPARATUS FOR SWITCHING FRAME-ORIENTED SERIAL DATA

(75) Inventors: Henning Mai, Holzkirchen (DE); Peter Spennemann, Taufkirchen (DE); Bernard Michels, Dachau (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/131,809

(22) Filed: Aug. 10, 1998

(30) Foreign Application Priority Data

Feb. 27, 1998 (DE) .......................................... 198 08 498
Feb. 27, 1998 (DE) .......................................... 198 08 495

(51) Int. Cl.[7] .............................................. H04L 12/50
(52) U.S. Cl. ...................................... 370/366; 370/465
(58) Field of Search ................................ 370/366, 389, 370/351, 352, 464, 465, 216, 347, 344, 345, 343, 522, 524, 503, 428, 411, 399; 712/15, 208, 200, 209, 220, 201, 26, 1, 16; 710/129, 63; 725/81, 118, 131, 116; 709/221

(56) References Cited

U.S. PATENT DOCUMENTS 4,179,587 A    12/1979   Herschtal
4,841,522 A    6/1989    Yamazaki
5,603,012 A  * 2/1997    Sotheran ..................... 370/450

OTHER PUBLICATIONS

Hiroshi Nagano et al.: "2048×2048 Time Division Switch VLSI", NEC Research & Development, 1988, Jul., No. 90, pp. 54–61.

* cited by examiner

Primary Examiner—Dang Ton
(74) Attorney, Agent, or Firm—Laurence A. Greenberg; Werner H. Stemer; Gregory L. Mayback

(57) ABSTRACT

Frame-oriented serial data, such as PCM data, are switched. Switching information is generated with the aid of a switching algorithm. The switching information is referred bit by bit to the data and it includes addresses of output lines of an interface of the apparatus. Because of the bit by bit switching, data from channels with a largely arbitrary bandwidth can be switched without passing multiple times through the switching apparatus. A bypass data path renders it readily possible to switch the last bit of an arriving PCM frame to the first bit of the next PCM frame. Thus each arbitrary bit of an input frame can be switched with a fixed delay of one PCM frame. The apparatus is advantageously embodied as an applications-specific circuit.

19 Claims, 16 Drawing Sheets

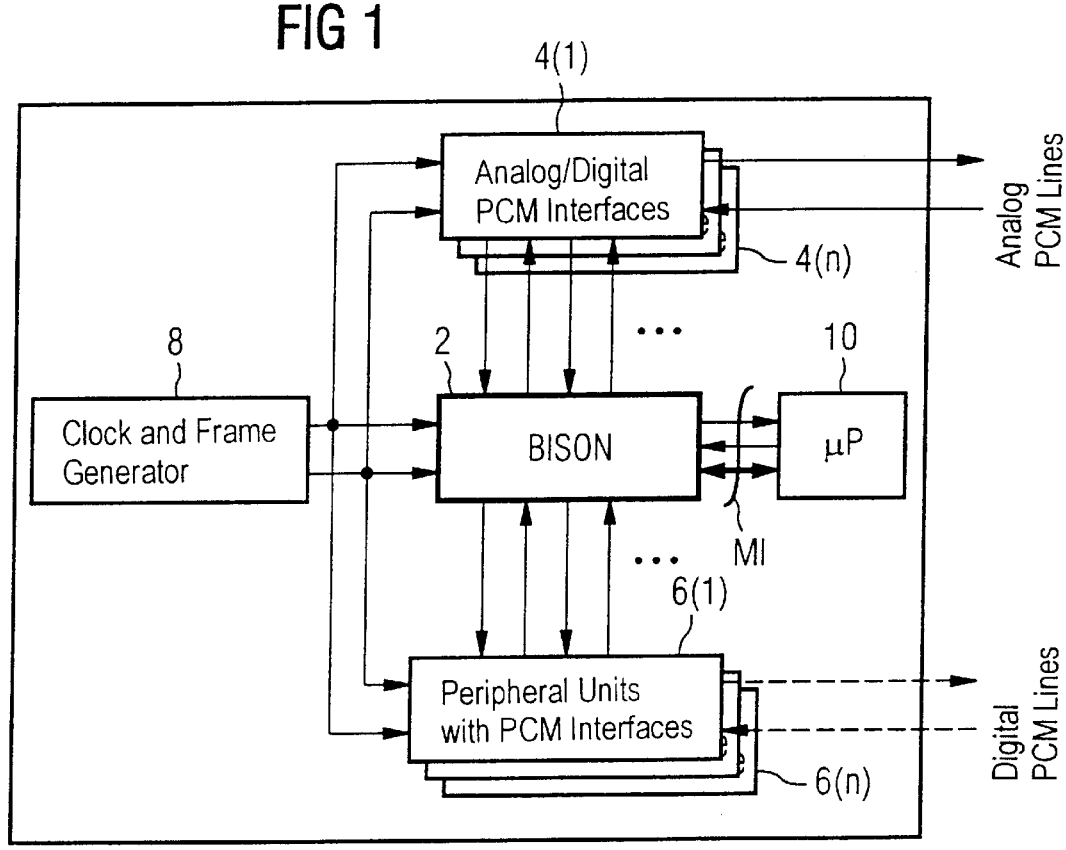

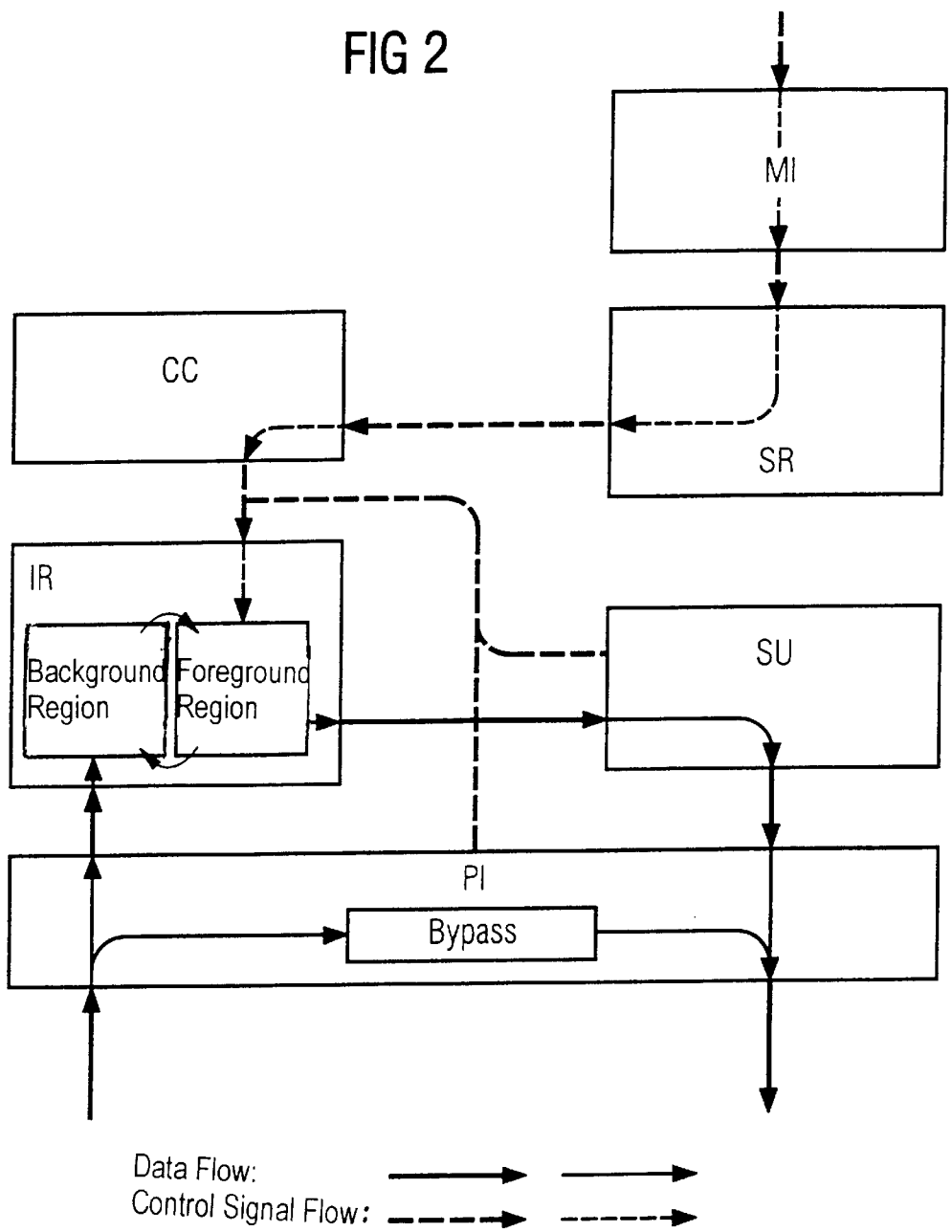

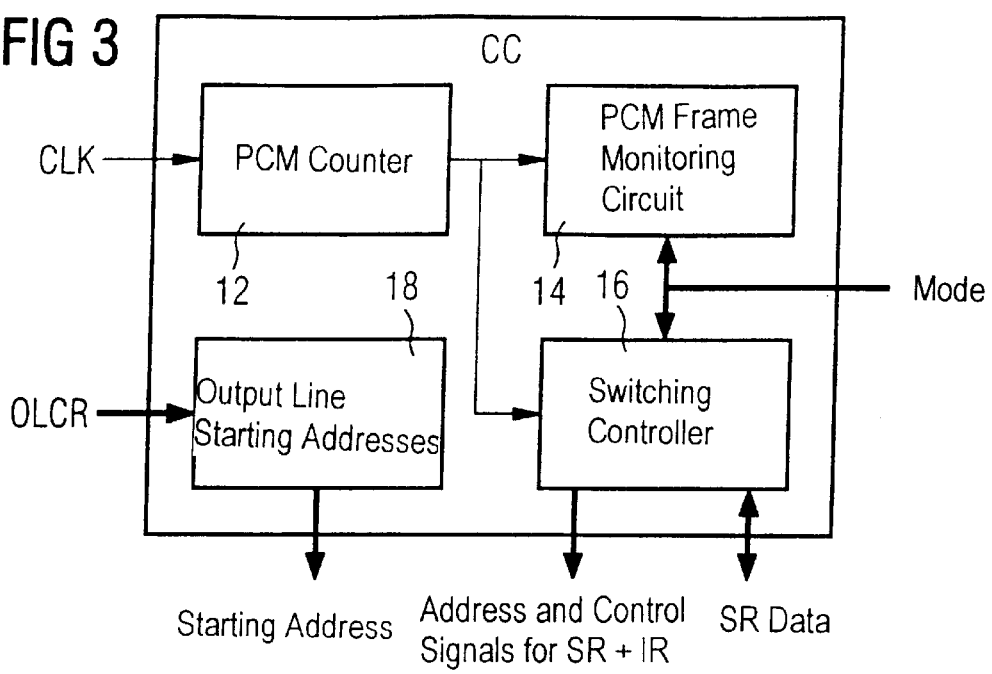
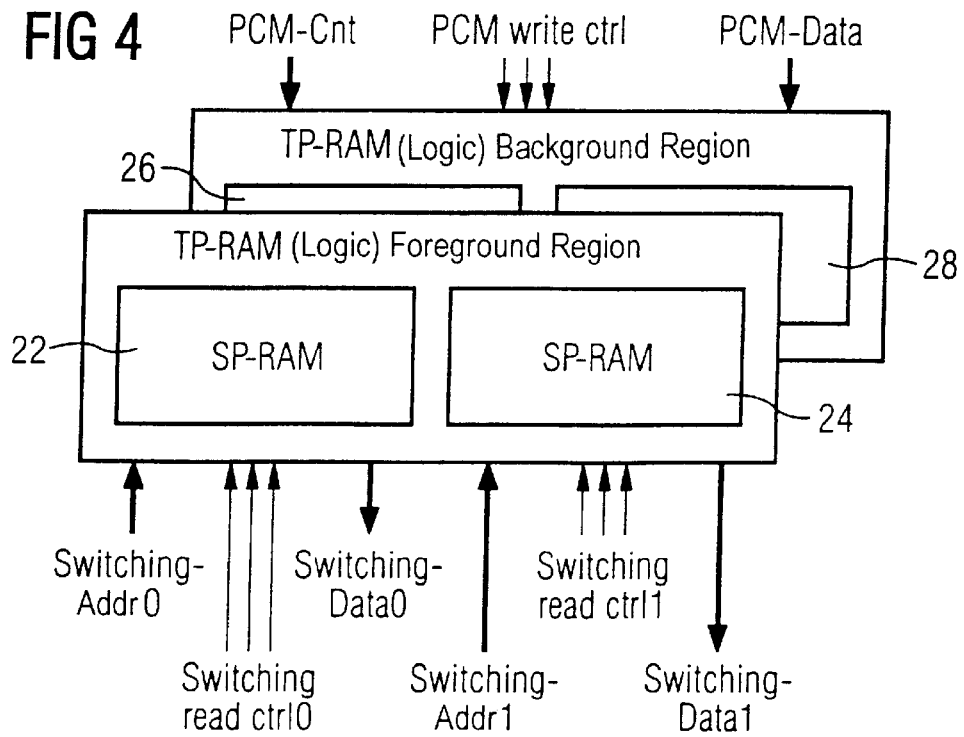

FIG 11

Output Line/Bit

-/- Switch these Addresses To 8000 hex

| Addr. | RAM 0 | RAM 1 | RAM 2 | RAM 3 |
|---|---|---|---|---|
| 0 | 1/0 | 2/0 | 4/0 | 5/0 |
| 1 | 4/1 | 5/4 | 1/1 | 2/1 |
| 2 | 1/2 | 2/2 | 4/2 | 5/8 |
| 3 | 4/3 | 5/12 | 1/3 | 2/3 |
| 4 | 1/4 | 2/4 | 4/4 | 5/16 |
| ... | ... | ... | ... | ... |
| 256 | 5/1 | 5/2 | 5/3 | 7/0 |
| 257 | 5/7 | 7/2 | 5/5 | 5/6 |
| 258 | 5/9 | 5/10 | 5/11 | 7/4 |
| 259 | 5/15 | 7/6 | 5/13 | 5/14 |
| 260 | 5/17 | 5/18 | 5/19 | 7/8 |
| ... | ... | ... | ... | ... |
| 512 | 7/1 | 8/0 | 10/0 | 10/1 |
| 513 | 10/2 | 10/3 | 7/3 | 8/1 |
| 514 | 7/5 | 8/2 | 10/4 | 10/5 |
| 515 | 10/6 | 10/7 | 7/7 | 8/3 |
| 516 | 7/9 | 8/4 | 10/8 | 10/9 |
| ... | ... | ... | ... | ... |
| 768 | 11/0 | 12/0 | 14/0 | -/- |
| 769 | 14/1 | -/- | 11/1 | 12/1 |
| 770 | 11/2 | 12/2 | 14/2 | -/- |
| 771 | 14/3 | -/- | 11/3 | 12/3 |
| 772 | 11/4 | 12/4 | 14/4 | -/- |
| ... | ... | ... | ... | ... |
| 1024 | -/- | -/- | -/- | -/- |
| 1025 | -/- | -/- | -/- | -/- |
| 1026 | -/- | -/- | -/- | -/- |
| 1027 | -/- | -/- | -/- | -/- |
| ... | ... | ... | ... | ... |
| 2047 | -/- | -/- | -/- | -/- |

FIG 12 A

| Addr. | RAM 0 | RAM 1 | RAM 2 | RAM 3 |
|---|---|---|---|---|
| 0 | 0 / 0 | 1 / 0 | 1 / 1 | 2 / 0 |
| 1 | 1 / 3 | 2 / 4 | 0 / 1 | 1 / 2 |
| 2 | 0 / 2 | 1 / 4 | 1 / 5 | 2 / 8 |
| 3 | 1 / 7 | 2 / 12 | 0 / 3 | 1 / 6 |
| 4 | 0 / 4 | 1 / 8 | 1 / 9 | 2 / 16 |
| ... | ... | ... | ... | ... |
| 256 | 2 / 1 | 2 / 2 | 2 / 3 | 4 / 0 |
| 257 | 2 / 7 | 4 / 1 | 2 / 5 | 2 / 6 |
| 258 | 2 / 9 | 2 / 10 | 2 / 11 | 4 / 2 |
| 259 | 2 / 15 | 4 / 3 | 2 / 13 | 2 / 14 |
| 260 | 2 / 17 | 2 / 18 | 2 / 19 | 4 / 4 |
| ... | ... | ... | ... | ... |
| 512 | 5 / 0 | 6 / 0 | 6 / 1 | 7 / 0 |
| 513 | 6 / 3 | 7 / 1 | 5 / 1 | 6 / 2 |
| 514 | 5 / 2 | 6 / 4 | 6 / 5 | 7 / 2 |
| 515 | 6 / 7 | 7 / 3 | 5 / 3 | 6 / 6 |
| 516 | 5 / 4 | 6 / 8 | 6 / 9 | 7 / 4 |
| ... | ... | ... | ... | ... |
| 768 | 10 / 0 | 10 / 1 | 10 / 2 | 10 / 3 |
| 769 | 10 / 6 | 10 / 7 | 10 / 4 | 10 / 5 |
| 770 | 10 / 8 | 10 / 9 | 10 / 10 | 10 / 11 |
| 771 | 10 / 14 | 10 / 15 | 10 / 12 | 10 / 13 |
| 772 | 10 / 16 | 10 / 17 | 10 / 18 | 10 / 19 |
| ... | ... | ... | ... | ... |
| 1024 | 11 / 0 | 11 / 1 | 11 / 2 | 11 / 3 |
| 1025 | 11 / 6 | 11 / 7 | 11 / 4 | 11 / 5 |
| 1026 | 11 / 8 | 11 / 9 | 11 / 10 | 11 / 11 |
| 1027 | 11 / 14 | 11 / 15 | 11 / 12 | 11 / 13 |
| 1028 | 11 / 16 | 11 / 17 | 11 / 18 | 11 / 19 |
| ... | ... | ... | ... | ... |

Output Line/Bit

- / -
Switch these Addresses To 8000 hex

FIG 12 B

| Addr. | RAM 0 | RAM 1 | RAM 2 | RAM 3 |
|---|---|---|---|---|
| 1280 | 13 / 0 | 13 / 1 | 14 / 0 | 14 / 1 |
| 1281 | 14 / 4 | 14 / 5 | 13 / 2 | 13 / 3 |
| 1282 | 13 / 4 | 13 / 5 | 14 / 8 | 14 / 9 |
| 1283 | 14 / 12 | 14 / 13 | 13 / 6 | 13 / 7 |
| 1284 | 13 / 8 | 13 / 9 | 14 / 16 | 14 / 17 |
| ... | ... | ... | ... | ... |
| 1536 | 14 / 2 | 14 / 3 | 15 / 0 | 15 / 1 |
| 1537 | 15 / 4 | 15 / 5 | 14 / 6 | 14 / 7 |
| 1538 | 14 / 10 | 14 / 11 | 15 / 8 | 15 / 9 |
| 1539 | 15 / 12 | 15 / 13 | 14 / 14 | 14 / 15 |
| 1540 | 14 / 18 | 14 / 19 | 15 / 16 | 15 / 17 |
| ... | ... | ... | ... | ... |
| 1792 | 15 / 2 | 15 / 3 | - / - | - / - |
| 1793 | - / - | - / - | 15 / 6 | 15 / 7 |
| 1794 | 15 / 10 | 15 / 11 | - / - | - / - |
| 1795 | - / - | - / - | 15 / 4 | 15 / 15 |
| 1796 | 15 / 18 | 15 / 19 | - / - | - / - |
| ... | ... | ... | ... | ... |

FIG 13

| Data Rate (PCM Input Line) = 8 MBit/s | | | | | | | | | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| Mode = '0' | No. of PCM-Input Line ||| PCM bit Number ||||||||||
| Data Rate (PCM Input Line) = 4 MBit/s |||||||||||||||||
| 15 | 14 | 13 | 12 | 11 | 10 | 9 | 8 | 7 | 6 | 5 | 4 | 3 | 2 | 1 | 0 |
| Mode = '0' | No. of PCM-Input Line |||| PCM bit Number |||||||||
| Data Rate (PCM Input Line) = 2 MBit/s |||||||||||||||||
| 15 | 14 | 13 | 12 | 11 | 10 | 9 | 8 | 7 | 6 | 5 | 4 | 3 | 2 | 1 | 0 |
| Mode = '0' | No. of PCM-Input Line ||||| PCM Input Line ||||||||
| 15 | 14 | 13 | 12 | 11 | 10 | 9 | 8 | 7 | 6 | 5 | 4 | 3 | 2 | 1 | 0 |
| Mode = '1' | | | | | | | | | | | | | | ENI | VAL |

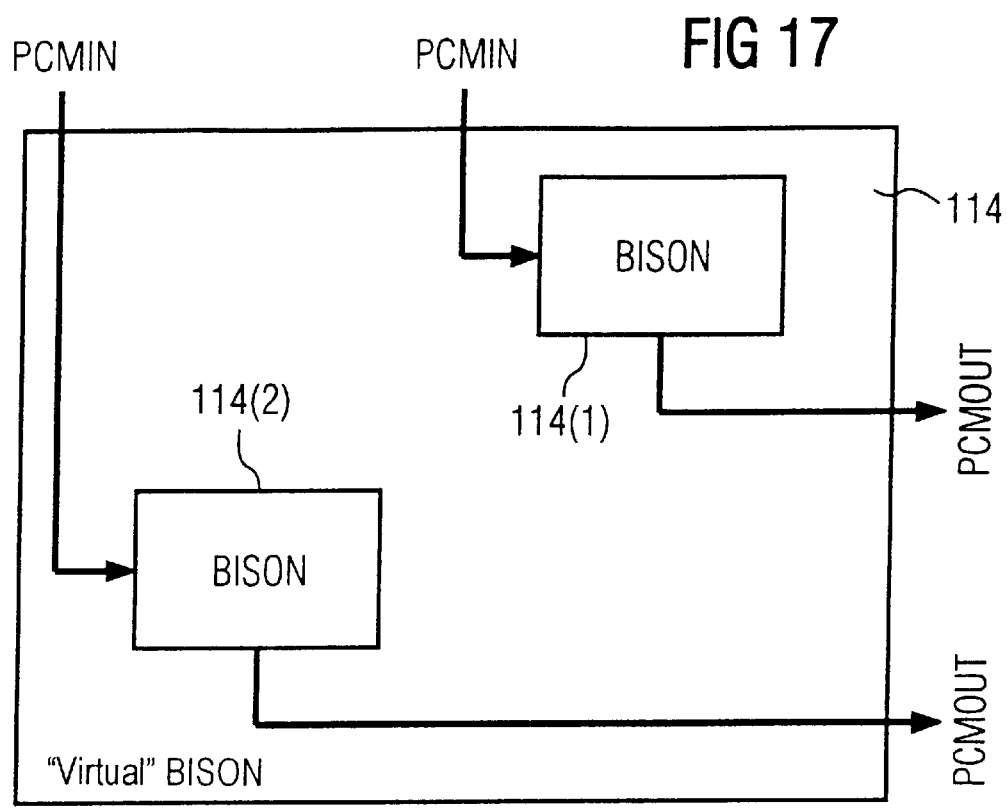

US 6,515,986 B1

METHOD AND APPARATUS FOR SWITCHING FRAME-ORIENTED SERIAL DATA

BACKGROUND OF THE INVENTION

Field of the Invention

The invention relates to a method and an apparatus for switching frame-oriented serial data, in particular PCM data in communications systems.

In GSM mobile radio systems, in switching speech and data in the various system components, the problem arises that eight kbit/s channels (one bit per PCM frame and multiples thereof) have to be switched. For instance, a half-rate channel has a bandwidth of eight kbit/s in GSM mobile radio systems at the interface Asub between the base station controller BSC and the transcoding unit TRAU and at the interface Abis between the base station BTS and the transcoding unit TRAU. A full-rate channel, on the other hand, has a bandwidth of 16 kbit/s. Switching should if at all possible be done without blocking, freely selectably and with a fixed guaranteed delay of one PCM frame (125 μsec). Similar problems arise in other communications systems as well.

In order to effect such switching, for instance in processing 16 kbit/s channels, it has been necessary to date to map a PCM frame with a data rate of 2 Mbit/s onto a PCM frame of eight Mbit/s. The information is transmitted four times to the switching apparatus and there switched to a 64-kbit/s base, and after switching the information is again mapped to 2 Mbit/s. This requires major expenditure for circuitry and attendant high costs. Such a task can be accomplished only to a limited extent using standard components. An implementation with standard components requires a large amount of space, which rises disproportionately with the number of channels. Present circuits do not assure that all the bits of an input frame will be transmitted together in the next output frame. Switching the last bit of input frame to the first bit of the next output frame makes very high demands. Yet this switching option is desirable, if channels of arbitrary bandwidth (n×8 kbit/s) are switched (for instance, the H11 channel in ISDN with 1536 kbit/s), without tearing apart the information in a channel.

SUMMARY OF THE INVENTION

It is accordingly an object of the invention to provide a method and a device for transmitting frame-oriented serial data, which overcome the above-mentioned disadvantages of the heretofore-known devices and methods of this general type and which switches PCM data so that channels of largely arbitrary bandwidth (n×8 kbit/s) and a high data throughput can be switched at a predetermined clock frequency.

With the foregoing and other objects in view there is provided, in accordance with the invention, a method of switching frame-oriented serial data, which comprises:

reading at least a first portion of serial data into an input RAM via an interface;

reading the data from the input RAM into a switching unit;

controlling a read/write operation of the input RAM with a central controller;

generating switching information with the central controller according to a switching algorithm, whereby the switching information is related to the data bit by bit and includes addresses of output lines of the interface;

controlling a switching unit with a control signal and controlling the switching information with the central controller;

switching the data with the switching unit bit by bit to the output lines of the interface in accordance with the switching information; and outputting the data via the interface.

By means of the bit by bit switching, data from channels of largely arbitrary bandwidth can be switched without passing through the switching apparatus multiple times. The apparatus is advantageously embodied as an applications-specific circuit.

In accordance with an added feature of the invention, the generating step comprises generating in the switching information, in addition to the addresses of the output lines, a bit-referred chronological order of a data output.

In accordance with an additional feature of the invention, the switching algorithm is stored in a switching RAM.

In accordance with another feature of the invention, a readout of the switching information, a readout of the data from the input RAM, and switching of the data in the switching unit is effected in parallel operation.

In accordance with a further feature of the invent ion, a bypass data path is defined in the interface and a second portion of the data is carried directly from the input of the interface to the output lines under control of the central controller via the bypass data path in the interface.

In accordance with again an added feature of the invention, single bits or a plurality of cohesive bits of the second portion of the data are switched through from an end region of an input frame to a front region at a beginning of an output frame to be output.

In accordance with again an additional feature of the invention, the interface is a PCM interface, and the method comprises transmitting the frame-oriented serial data in PCM frames.

In accordance with again another feature of the invention, the data is read out from the interface into a background region of the input RAM, while the data from a foreground region of the input RAM are read out into the switching unit, and the foreground and background regions are transposed after a frame has been processed.

In accordance with again a further feature of the invention, the data switched by the switching unit are read into a background region of an output register, while the data from the foreground region are output to the output lines.

In accordance with yet an added feature of the invention, at least two bits are switched in parallel in the switching unit and they are stored.

In accordance with yet an additional feature of the invention:

a starting address is generated by an address mapping algorithm via a reading table from a number of a respective output line;

an intermediate data set is generated from an OFFSET address via a control data set, so that different data rates can be taken into account;

the intermediate data set and the starting address are linked together, and starting bits of the data set generated in the linking step are transposed, such that the switching information for the bits of one output line are distributed to non-cohesive cells of the switching RAM, so that in quasi-sequential processing of the switching RAM, the bits are read out of the input RAM in an order in which they are chronologically required for each output line.

In accordance with yet another feature of the invention, the linking of the intermediate data set and the starting address is additive linking.

In accordance with yet an additional feature of the invention, the quasi-sequential processing comprises reading out equidistant cells of the switching RAM in succession.

In accordance with a further feature of the invention, a data rate to be processed is selected in a frame of the switching algorithm, and an equal data rate is configured on all the output lines or different data rates on individual output lines or groups of output lines.

With the above and other objects in view there is also provided, in accordance with the invention, an apparatus for switching frame-oriented serial data, which comprises:

an input RAM and a plurality of output lines;
a PCM interface connected to the output lines and to the input RAM, the PCM interface reading a first portion of serial data into the input RAM and outputting the data to the output lines;
a switching unit connected between the input RAM and the output lines, the switching unit receiving the data from the input RAM, switching the data bit by bit, and outputting the data to the output lines;
a central controller connected to the input RAM and to the switching unit, the central controller generating switching information with a switching algorithm wherein the switching information is referred to the data bit by bit and includes addresses of the output lines, and the central controller controlling a read/write operation of the input RAM and controlling the switching unit by means of a control signal and the switching information.

In accordance with yet again an added feature of the invention, a switching RAM is provided which stores an address mapping algorithm, and wherein a readout of the switching information from the switching RAM, a readout of the data from the input RAM, and a switching of the data in the switching unit are effected in parallel mode.

In accordance with yet again another feature of the invention, the PCM interface has an input register and a bypass data path including a bypass register into which bypass bits are read, under control of the central controller, from the input register of the PCM interface.

In accordance with a concomitant feature of the invention, a multiplexer is connected downstream of the bypass register, the multiplexer outputting the data of the bypass data path and the data of the first portion of the data to the output lines under control of the central controller.

By means of a bypass data path, it is readily possible to switch the last bit of an incoming PCM frame to the first bit of the next PCM data frame. Each arbitrary bit of an input frame can thus be switched with a fixed delay of one PCM frame (125 $\mu$sec). By means of the parallel but still bit-by-bit switching of a plurality of bits, the data rate can be increased. The parallel mode of data processing, in an advantageous feature of the invention, assures that a high data throughput of 2, 4 or 8 Mbit/s will be attained.

According to the invention, a non-blocking switching for up to 4096×8 kbit/s channels is attained (32 MBit/s maximum throughput at 16,384 MHz), because switching is done bit by bit, so that a genuine bit switch is used. Moreover any arbitrary multiple of 8 kbit/s (n×8 kbit/s, where n=1, . . . , 1024) in any arbitrary combination as a channel is possible.

One advantageous embodiment of the method of the apparatus shows how the switching information is distributed in the switching RAM. Already on being written into the switching RAM, the data are distributed in such a way that in the ensuing readout of the various identical physical addresses of four RAMs, the required switching information is output in the correct order.

In another advantageous feature of the invention, a method is disclosed for which there is a demand, especially in the mobile radio field (especially for half-rate applications) and other fields that do not use multiples of 64 kbit/s. Each PCM input line and output line can be configured entirely freely to two or four or eight Mbit/s, so that a line can be physically turned off or need not be present, or operation can be effected at three different data rates. This degree of freedom is a substantial advantage of the exemplary embodiment of the apparatus known as BISON (for bit switch for optimized network architectures) for switching the data, compared with conventional circuits. The BISON component is a programmable PCM switching component which—as shown in the exemplary embodiment—has all the functions for realizing the desired information flow in a way that is as simple as possible.

In further advantageous features of the invention, the throughout and/or the number of input and output lines can be increased. In other words, a plurality of BISON components can be combined in cascadable fashion into a switching matrix of arbitrary size; the outputs on a bit basis can be put in the tristate condition. With the BISON component, switching matrices of arbitrary size and for channels of various bandwidths can therefore be constructed substantially less expensively than before. In addition, the switching matrices can be constructed in a substantially more space-saving way than before.

In accordance with another feature of the invention, two or more of the above-described apparatus are connected to one another for switching frame-oriented serial data.

Other features which are considered as characteristic for the invention are set forth in the appended claims.

Although the invention is illustrated and described herein as embodied in method and apparatus for switching frame-oriented serial data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block diagram showing the location of a BISON component in a data transmission network;

FIG. 2 is a block diagram showing the layout of the BISON component;

FIG. 3 is a block circuit diagram showing the layout of the central controller;

FIG. 4 is a schematic view of the memory structure in the input RAM;

FIG. 11 is an address map showing an example for address mapping at 32 Mbit/s and 16,384 MHz;

FIGS. 12A and 12B are similar views illustrating an example for address mapping at 64 Mbit/s and 32,768 MHz;

FIG. 13 is a diagrammatic view of exemplary addresses for data rates of 2, 4 and 8 Mbit/s, respectively;

FIG. 17 is a block diagram of a virtual BISON component with two individual BISON components in which the number of inputs/outputs is doubled to 32.

DESCRIPTION OF THE PREFERRED EMBODIMENTS

Figure 5:
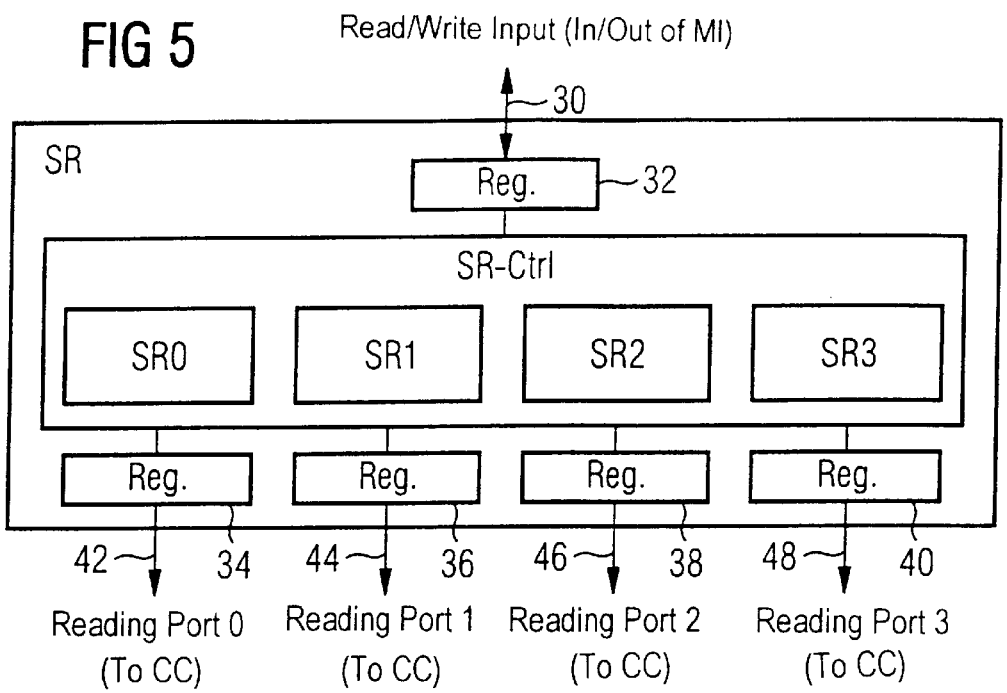
FIG. 5 is a schematic view of the switching RAM.

The exemplary embodiments described below relate to use in the GSM system, but other applications are equally within the scope of the invention. In the GSM system, PCM data that are transmitted in frame-oriented and serial fashion must be distributed. The data are present logically in channels and should be mapped physically on PCM lines. The data rates are in the range from 8 kbit/s to 64 kbit/s and more. The BISON component is a programmable PCM switching circuit that offers all the functions for realizing the desired information flow.

In a base station of the GSM system, the BISON component switches PCM data from an analog interface controller to an internal peripheral unit having a PCM interface 4(1) through 4(n), or some other analog PCM interface controller. As shown in FIG. 1, the BISON component 2 exchanges data both with analog/digital PCM interfaces 4(1) through 4(n) and with peripheral units 6(1) through 6(n) with PCM interfaces. The communication over the internal PCM lines from and to the BISON component 2 is synchronized by a common PCM clock and frame signal, which is generated by a clock and frame generator 8. Finally, the BISON component 2 is also in communication, via a microprocessor interface MI, with a microprocessor 10, by way of which the configuration of the BISON component 2 is implemented in accordance with the profile of the channel.

FIG. 2 shows a block diagram of a BISON component with a microprocessor interface MI, a central controller CC, a switching RAM SR, a switching unit SU, an input RAM IR, and a PCM interface PI.

Data flow (solid line arrows) is as follows: PCM input data are read into the PCM interface PI and written into the background region of the input RAM IR. During this time, data from the foreground region of the input RAM IR are transmitted to the switching unit SU as new data. The addresses at which the input RAM IR is read out into the foreground region are forwarded by the central controller CC. The switching unit SU selects one bit from the read data, stores the bit in a register, and transmits the selected bits to the PCM interface PI when the register is full. The PCM interface PI distributes the data from the register among the PCM output lines.

Control signal flow (dashed line arrows) is as follows: Via the microprocessor interface MI, information for addressing is written into the switching RAM SR. The address of a cell of the switching RAM SR where the switching information is written represents precisely one bit of the PCM output data. In other words, the address selects a certain output line and the bit position, that is, the chronological order of the bits of an output line, in a PCM frame, which is transmitted via the PCM output line.

The switching information contains the information about what is to be done with that bit. If the mode bit of the switching information is equal to "1", then the switching information selects one bit from a predetermined input line. If the mode bit of the switching information is equal to "0", then the switching information determines whether the output line is in the tristate condition for the duration of the output bit, or whether a bit with a predetermined value which is contained in the switching information, is sent to the PCM output line.

The central controller CC reads the switching information from the switching RAM SR. If the mode bit is equal to "1", which means that bit mapping should be done, then the central controller CC selects the normal data path, if the bit to be switched is not time-critical. Otherwise, the central controller CC selects a bypass data path. If the normal data path has been selected, then the central controller CC furnishes the read-out address and furnishes the switching unit SU with the information as to which bit of the input RAM data is to be selected. If the bypass data path has been selected, then the central controller CC selects the bit that is to be switched from a PCM input-bypass register, so that the bit is passed directly on to the PCM output line.

The PCM interface PI writes the received data in the background region of the input RAM IR. At the same time, two independent addresses are read out from the foreground region of the input RAM IR, in order to switch one bit each to a selected position of a PCM frame in an output line. Proceeding in this way, the instantaneous PCM frames of each input line are stored in memory in background region, while the previously stored PCM frames are switched to the output lines. This parallel mode of operation, that is, the simultaneous readout of two addresses, is necessary in order to attain the requisite throughput in bit-by-bit switching. This parallel mode of operation is realized in various partial regions of the BISON component.

Referring now to FIG. 3, the central controller CC controls the data flow, in the BISON component 2, of the PCM data of 16 PCM input lines, for instance, through the input RAM IR and the switching unit SU, or in special cases through a bypass register (described below) to the, for instance, 16 PCM output lines. The central controller CC has all the timing information required by the synchronizing PCM signal PFRAME and the clock signal CLK, which drives an internal PCM counter 12. To keep the units that communicate with the BISON component informed, the PCM frame signal is monitored in a PCM frame monitoring circuit 14. An interrupt is generated if an error occurs in the synchronizing PCM frame pulse. The central controller CC has a switching controller 16 as an interface with the switching RAM SR, in order to supply switching information to the switching unit SU. To assure correct access, the central controller CC calculates the starting address of each output line in the switching RAM SR from the output signals of an output line configuration register OLCR (described below).

The timing information required in the BISON component is derived from the PCM counter 12. The counter increments by one each time the leading edge of the clock signal CLK appears, and it is reset synchronously with the detection of the synchronizing pulse PFRAME. The central controller CC is therefore informed at all times about the instantaneous bit in a PCM frame that is to be processed.

The PCM frame signal PFRAME is also monitored by the PCM counter 12. The PCM counter 12 generates the interrupt if the pulse PFRAME arrives too late with reference to the expected beginning of the next frame, or in other words if the PCM counter 12 is switched back to "0" and no pulse PFRAME is detected. An interrupt is also generated whenever the pulse PFRAME is detected too early relative to the expected beginning of the next frame, or in other words if the synchronized PCM counter 12 has the wrong value. The defined comparator value depends on the state of the clock frequency signal CLKFR. The PCM counter 12 therefore expects the next synchronizing pulse of the pulse PFRAME at the value 2047, if the clock signal is configured for a frequency of 16,384 MHz. This comparator is defined at 4095 if the clock signal is 32,768 MHz.

The starting address and the space required for the address for each output line are calculated by the output line configuration register OLCR. After the output line configuration register signal has been written in, a new calculation is performed, by which the contents of the switching RAM SR are newly subdivided. If the calculation shows a throughput of more than 32 Mbit/s at 16,384 MHz, or 64 Mbit/s at 32,768 MHz, then an interrupt is generated.

The switching controller 16 is used for timing coordination, in order to furnish a set of 16 bits at 16,384 MHz, or 32 bits at 32,768 MHz, at the PCM interface and to supply the PCM output lines at precisely the correct time. The first step in this complex process is to read out four addresses from the switching RAM SR every other clock cycle. After the switching information is read out of the switching RAM SR, the switching controller 16 must decide whether a bit from the PCM input should be passed on to the PCM output through the input RAM IR and the switching unit SU, or whether the bit should be passed on directly from the PCM input to the PCM output in the bypass mode, if the bit at the PCM input is needed very soon at the PCM output. As seen in FIG. 2, the two data paths have the same starting and ending point but have a different transmission course, so that a corresponding individual-bit timing control of switching is again necessary.

Reference is now had to FIG. 4, which shows a logical structure of the input RAM IR. The input RAM IR comprises four SP RAMS 20–26 (for instance with 1024·16 bits; SP RAM stands for Single Port RAM). Two SP RAMs, for instance the SP RAMs 20, 22, are logically grouped together in such a way that they form a TP RAM (Triple Port RAM).

The PCM interface PI writes the receives data in the TP RAM of the background region. At the same time, two independent addresses are read out from the TP RAM of the foreground region, in order to switch one bit from each reading port to a selected position of a PCM frame on an output line. By proceeding in this way, the current PCM frames are collected from each input line in the TP RAM of the background region, while the previously collected PCM frames are switched to the output lines. To make this function possible, the signals "PCM-Data", "PCM write ctrl" and "PCM-Cnt" are fed into the TP RAM of the background region, as shown in FIG. 4. The SP RAM 22 of the background region receives the signals "Switching-Adr0" and "Switching read ctrl0" and outputs the signals "Switching-Data0", while the SP RAM 24 of the foreground region receives the signals "Switching-Adr1" and "Switching read ctrl1" and outputs the signals "Switching-Data1."

Referring now to FIG. 5, the switching RAM SR furnishes the necessary information for mapping the input PCM data onto the output PCM data, that is, switching them. Each address of the switching RAM SR represents a certain bit position on one of the PCM output lines. The data of this address precisely designate one bit of the input PCM data that are stored in memory in the input RAM IR, which bit is mapped as.described above onto the PCM output line. If a throughput of 32 Mbit/s at 16,384 MHz or 64 Mbit/s at 32,768 MHz is required, then two bits per clock cycle must be mapped. If every other clock signal is made available for access via the microprocessor interface MI, then it is necessary to map four bits for every second clock cycle. In other words, every other clock cycle, four addresses of the switching RAM SR must be read out.

To make this function possible, the switching RAM SR has a read-\write input 30 for writing in or reading out data from the microprocessor interface MI. The data, via a register 32, reach four memory regions in the switching RAM, designated SR0, SR1, SR2 and SR3, each with 1024 16 bits, for instance. The outputs of the switching RAMs SR0, SR1, SR2 and SR3 each pass via a respective register 34, 36, 38, 40 to reach reading ports 42, 44, 46, 48, and from there they reach the central controller CC.

Figure 6:
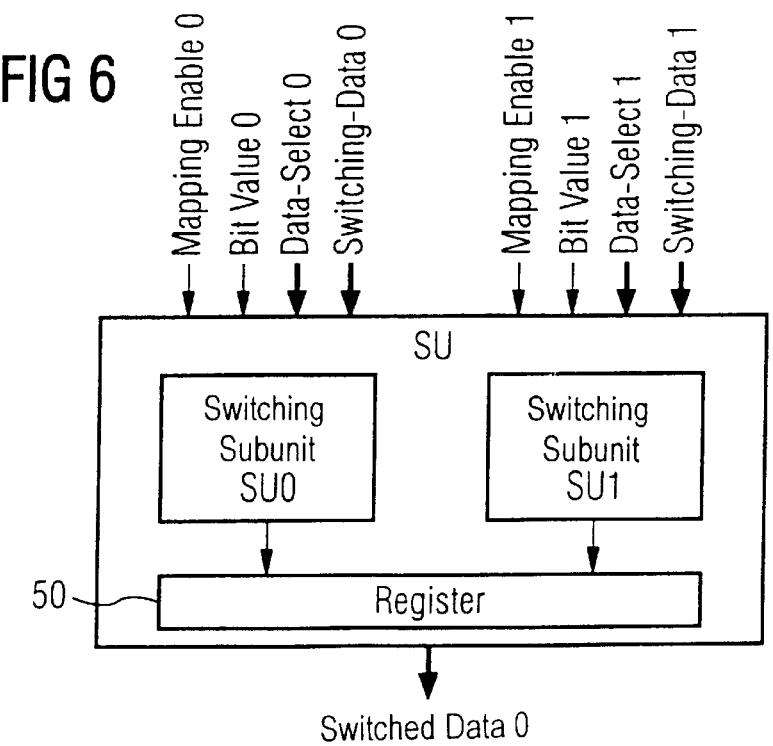
FIG. 6 is a schematic view of the switching unit.

FIG. 6 shows the structure of the switching unit SU. The switching unit SU is supplied with PCM input data and the corresponding switching information that has been selected by the central controller CC. At a clock frequency of 16,384 MHz, two bits per clock cycle must be switched in order to attain a throughput of 32 Mbit/s. Two switching RAM subunits SU0 and SU2 are therefore connected parallel, each of which switches one bit per clock cycle. While 16 bits are distributed to the output lines, as programmed in the output line configuration register, the next 16 bits are collected in a register 50. The above-described procedure is used in order to fill the register 50 if the switching is turned on. If the bit switching is turned off and the pattern insertion is switched on, then the VAL bit, instead of the selected bit from the switching information, is inserted into the register 50. The output line is in a tristate condition, if the. switching and the insertion of patterns is turned off.

The signals "Switching-Data 0", "Data-Select 0", "Bit Value 0" and "Mapping Enable 0" are input into the switching RAM subunit SU0, and the corresponding signals "Switching-Data 1", "Data-Select 1", "Bit Value 1" and "Mapping Enable 1" are input into the switching RAM subunit SU1. The output is via the register 50 in the signal "switched data 0."

Via the PCM interface PI, the BISON component can receive and process signals from up to 16 PCM input lines and output them via 16 PCM output lines. The control is effected via a frame synchronizing signal PFRAME and a clock signal SCLK. One PCM frame comprises a plurality of time slots, with eight bits per time slot.

Figure 7:
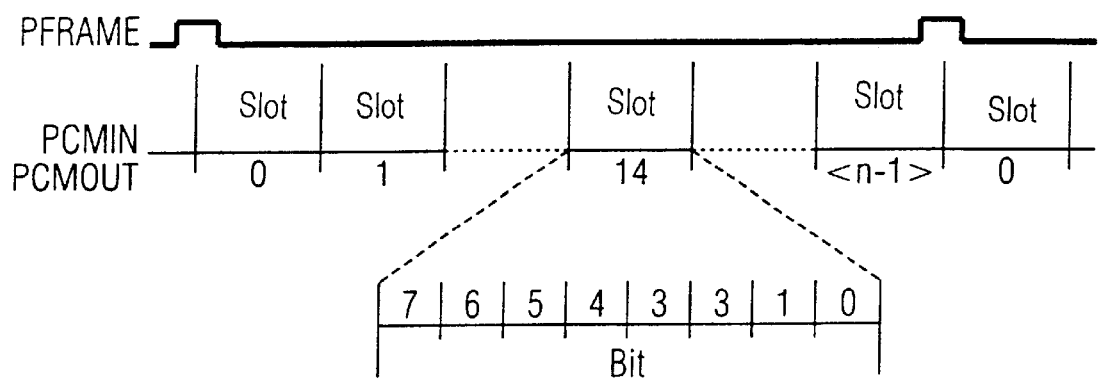
FIG. 7 is a structure diagram of a PCM frame in the PCM interface.

Reference is now had to FIG. 7, which schematically illustrates the structure of a PCM frame. In the BISON component, as a global setting for all the input and output lines, the edge of the PCM clock signal can be considered to scan the data and frame signal and a "time slot 0 delay after PFRAME". For each input line, the data rate can be configured independently (off; two Mbit/s, 4 Mbit/s, 8 Mbit/s). For each output line, the data rate (off, 2 Mbit/s, 4 Mbit/s, 8 Mbit/s), an active level of the tristate buffer, and a tristate guard period of one-quarter of the data period can be configured independently. The total data rate of the output lines cannot exceed 32 Mbit/s at 16,384 MHz or 64 Mbit/s at 32,768 MHz. One PCM frame comprises 256 bits (at 2 Mbit/s), 512 bits (at 4 Mbit/s) or 1024 bits (at 8 Mbit/s).

In contrast to the prior art, the BISON component operates only with individual bits, rather than with time slots that are made up of bits. The entire structure is designed for bit-oriented switching.

Each address represents one bit of a PCM frame of a particular output line. Therefore, each output line requires a different amount of address space, which depends on the data rate of that output line. The partitioning of the switching RAM SR therefore depends on the value of the output line configuration register. The starting address of a PCM output line can be calculated by the following equation:

Starting address (0)=0;

Starting address ($i$)=starting address ($i$–1)+range ($i$–1);$ic$[1; 15];

where range ($i$–1) can be taken from the following table:

| Data rate | Range (dec) |
|---|---|
| OFF | 0 |
| 2 Mbit/s | 256 |
| 4 Mbit/s | 512 |
| 8 Mbit/s | 1024 |

Figure 8:
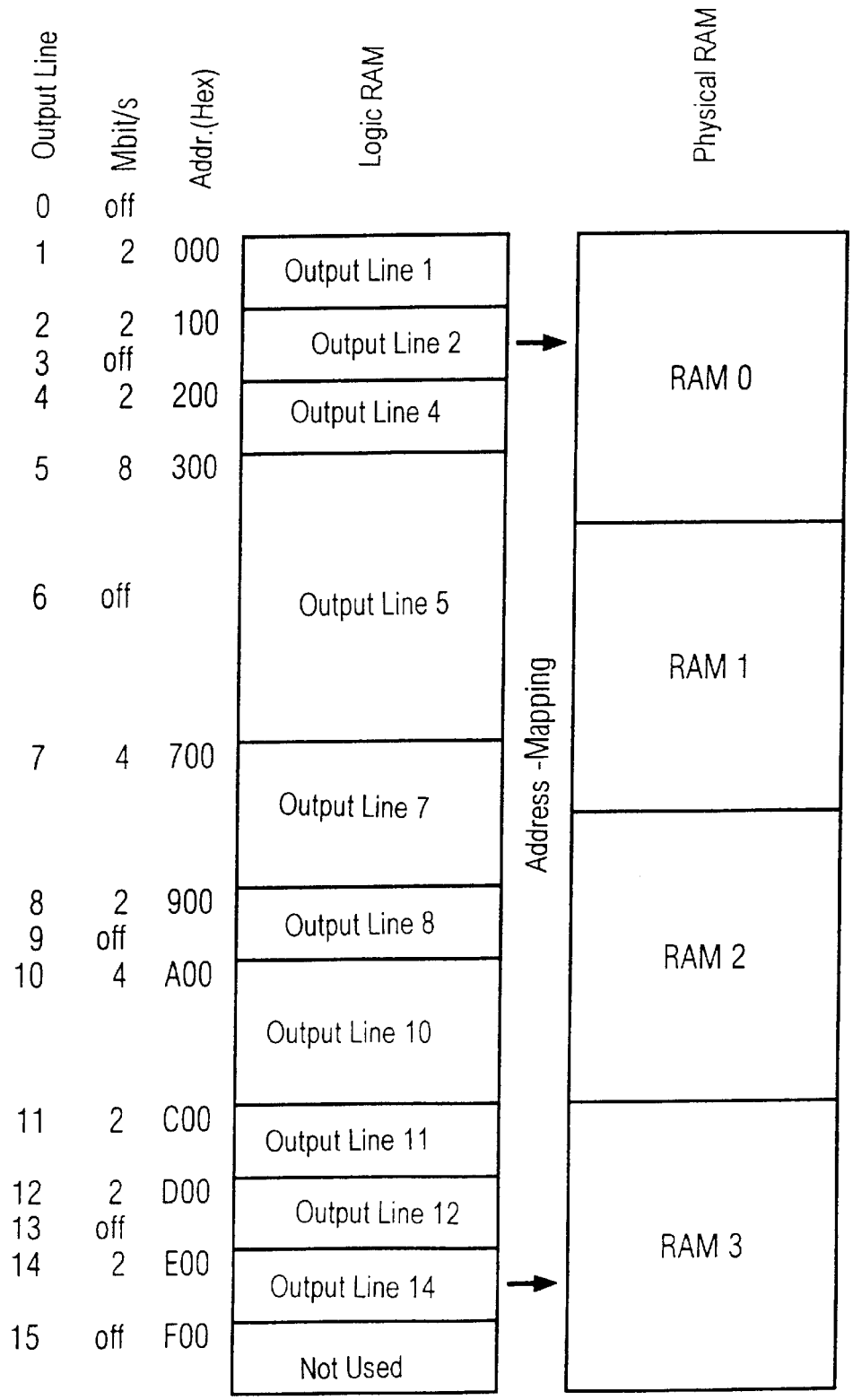
FIG. 8 is a diagrammatic view of an example for a throughput of 32 Mbit/s at 16,384 MHz.
Figure 9:
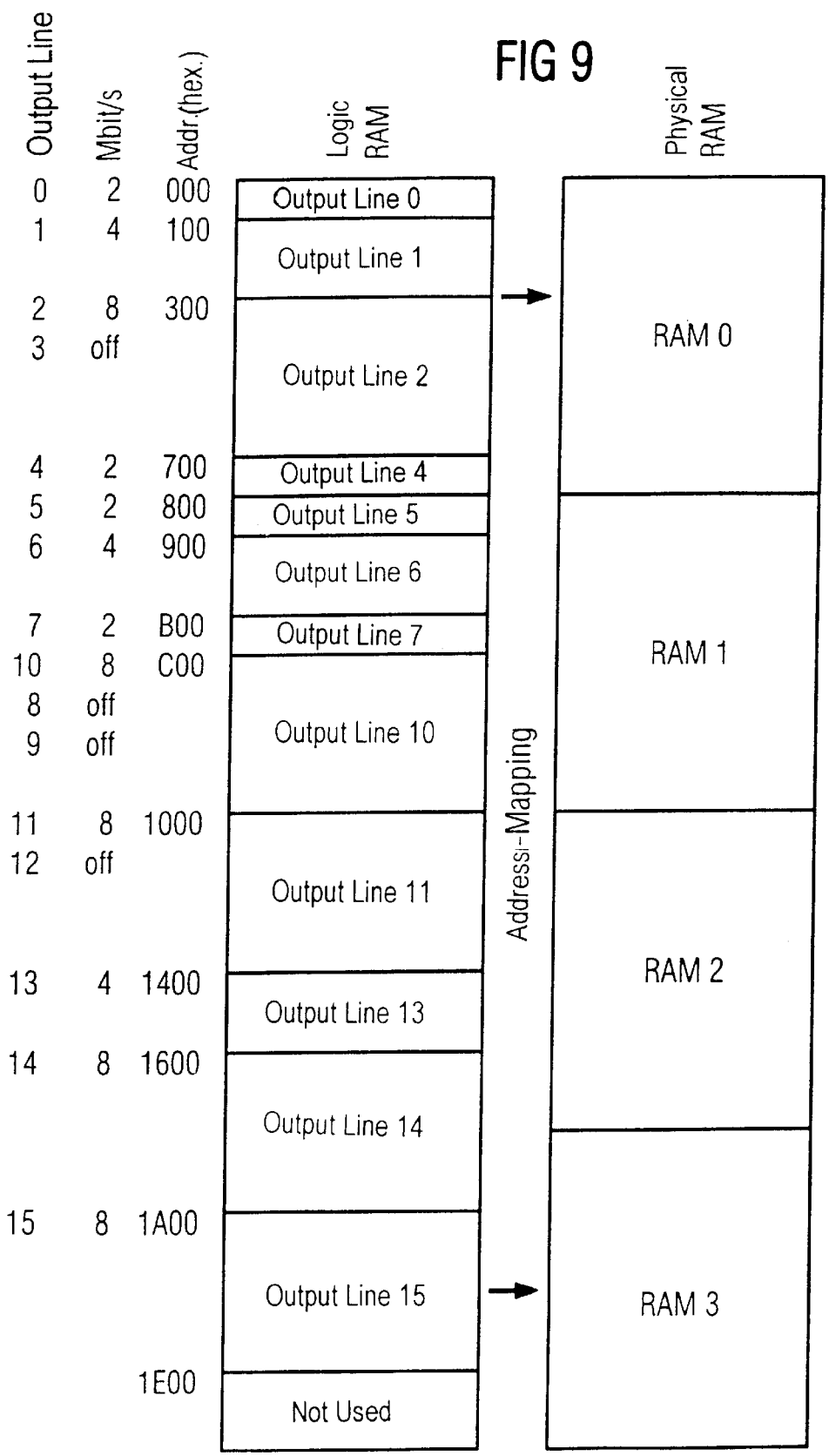
FIG. 9 is a similar view of an example for a throughput of 64 Mbit/s at 32,768 MHz.

FIG. 8 shows one example of a possible configuration of the PCM output lines and the corresponding partitioning of the switching RAM SR into four ranges RAM0, RAM1, RAM2 and RAM3, for a throughput of 32 Mbit/s at 16,384 MHz. FIG. 9 shows a corresponding example for a throughput of 64 Mbit/s at 32,768 MHz.

As seen in FIGS. 8 and 9, the address spaces for each output line that is unequal to off are concatenated without gaps. A new configuration of the PCM output lines therefore causes a new subdivision of the switching RAM SR, with the result that the configuration of the switching RAM SR is superseded; that is, the entire switching RAM SR is rewritten. The examples also show that the BISON component has a switching capacity of up to 64 Mbit/s at 32,768 MHz, because the switching RAM SR is limited to 8192 addresses (8192 bits/125 $\mu$sec=64 Mbit/s). The configuration of the PCM output lines with less than 64 Mbit/s produces unused address space. If the BISON component is operated at 16,384 MHz, then the switching capacity of the BISON component is limited to 32 Mbit/s, because only two bits per clock cycle can be switched through.

When the BISON component or the central controller CC is turned on, the switching unit SU receives 16-bit data from the input RAM IR and selects the particular bit that is to be switched to a selected PCM output line. The information to select this bit is output by the central controller CC, which reads out this information from the switching RAM SR. The central controller CC must read four addresses for each four reading accesses (at 16,384 MHz, or for each eight reading accesses (at 32,768 MHz), in order to switch 16 bits (at 16,384 MHz) or 32 bits (32,768 MHz) from the input to the output. To enable the central controller CC to read the required switching information, taking any possible output line configuration into account, the switching information must be generated by a switching algorithm stored in the switching RAM SR, or in the portions RAM0, RAM1, RAM2, RAM3 of the switching RAM SR.

Figure 10:
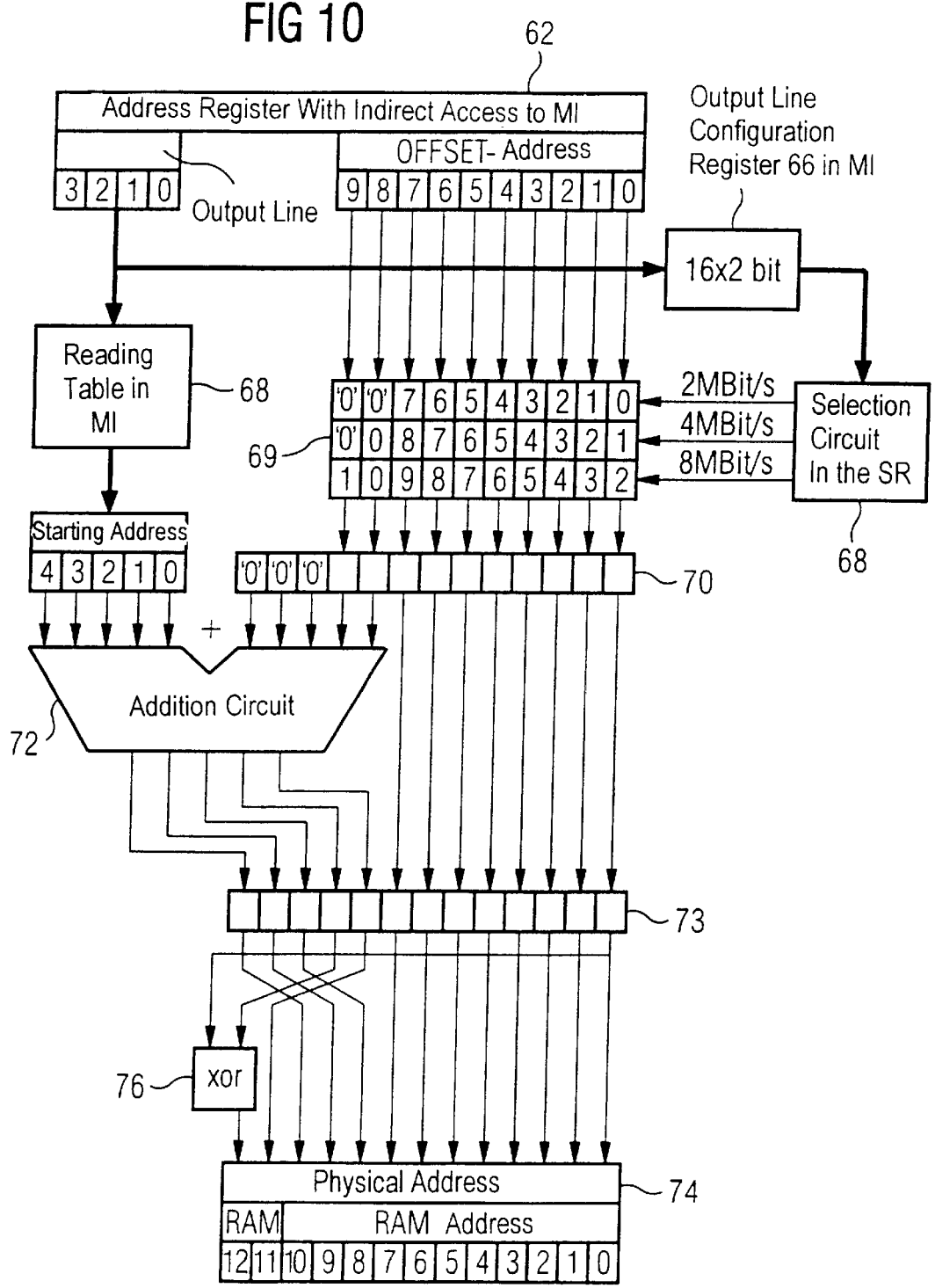
FIG. 10 is a schematic view of an example for a switching algorithm for data transmission at 2, 4 or 8 Mbit/s.

An address mapping algorithm that forms a part of the switching algorithm is shown in FIG. 10. In an address register 62 with indirect access in the microprocessor interface MI, the number of the output line (4 bits) and an offset address (10 bits) are stored.

From the number of the output line, a starting address (5 bits) is generated via a reading table 64, which is also present in the microprocessor interface MI. From the designation of the output line, the data rate to be processed, whether 2 Mbit/s or 4 Mbit/s or 8 Mbit/s, is also selected via an output line configuration register 66 in the microprocessor interface MI and a selection circuit 68 in the switching register SR. A control register set 69 includes various data rate-referred data. At a data rate of 8 Mbit/s, for instance, the values from the places 0 and 1 of the OFFSET address are used as values for the fourth and fifth places from the left of an intermediate data set 70 mapped below it.

The starting address and the values of the first five places from the left of the intermediate data set 70 are added bit by bit in an addition circuit 72 and form the first five places from the left for a data set 73, which represents intermediate values for a physical address 74. Places 6–13 of the data set 73 correspond to the places 6–13 of the intermediate data set 70.

From the data set 73 of intermediate values for the physical address, the final physical address 74 is obtained by using the values of the first three places of the data set 73 for the places 3–5 of the physical address. The value of the fifth place of the data set 72 is used for the second place of the physical address 74, and the value of the fourth place of the data set 73 is delivered, together with the value of the 13th place of the data set 73, to an XOR gate 76, whose output represents the value for the first place of the physical address 74. By transposing the first five places of the data set 73, it is assured that the bits of one output line will.be distributed among different subranges of the switching RAM SR. This is necessary so that in the present example four addresses can be read out simultaneously and parallel from the switching RAM SR. The XOR gate 76 is needed so that this mechanism can be realized even at a data rate of 2 Mbit/s.

As already explained, 16 bits at the PCM output line must be furnished within eight clock cycles if a throughput of 32 Mbit/s is to be achieved. The switching controller SC in the central controller CC must read four addresses out of the switching RAM SR for every two clock cycles. The switched bits are written into a register in the switching unit SU, which furnishes the information for the PCM output lines. To fill the register, the switching RAM SR must be read out four times at 16,384 MHz, or twice as often at 32,768 MHz.

If the partitioning of the switching RAM SR when the output lines are configured for 16·2 Mbit/s is considered, then the switching algorithm becomes as follows:

1) Read the four addresses 0 from the four RAMs
2) Switching is effected in two steps, because only two independent subunits are present in the switching unit (SU):
   i) switch one bit for OL0 and OL8
   ii) switch one bit for OL4 and OL12
3) Repeat steps 1 and 2 for the addresses 256, 512 and 768
4) Increment the value of the addresses (0, 256, 512, 768) by one and repeat steps 1–3 up to the values (255, 511, 767, 1023)

When even-numbered addresses are read out, then the information from the RAMs 0 and 1 are switched before the information of the RAMs 2 and 3; for odd-numbered addresses, it is the opposite.

The above example illustrates the case where all 16 output lines are operated at 2 Mbit/s. However, the register can also be loaded with any arbitrary configuration of output lines, for instance to implement switching in accordance with FIG. 8.

These examples show that the PCM input and output lines can be configured entirely freely, specifically in such a way that one line can be physically turned off or need not be present, or operation can be done at three different data rates.

The result from the use of the address mapping algorithm is shown in FIG. 11, for mapping 32 Mbit/s at 16,384 MHz, and in FIGS. 12A and 12B for mapping 64 Mbit/s at 32,768 MHz. It is thus assured that when the switching algorithm regions RAM0, RAM1, RAM2 and RAM3 are read out, for instance the addresses having the number 0, 256, 512 and 768 can each be read out parallel in sets of 4; the addresses for four bits on one output line are each stored in different switching RAM subranges, thus making collision-free read-out possible.

In each switching cycle, the central controller CC, which is configured for 16,384 MHz, must read four equidistant addresses quasi-sequentially out of each RAM in the switching RAM SR, and these addresses are represented by the following groups of four numbers:

(0, 256, 512, 768);
(1, 257, 513, 769); . . . ;
(n, n+256, n+512, n+768); . . . ;
(255; 511; 767, 1023).

For a 32,768 MHz configuration, eight addresses from each RAM in the switching RAM SR must be read out as follows in each mapping cycle:

(0, 256, 512, 768, 1024, 1280, 1536, 1792);
(1, 257, 513, 769, 1025, 1281, 1537, 1793);
(n,n+256,n+512,n+768,n+1024,n+1280,n+1536,n+1792); . . . ;
(255, 511, 767, 1023, 1279, 1535, 1791, 2047).

Each address of the switching RAM SR contains one 16 bit piece of information as switching information, for switching one bit of the input RAM IR to a position of an output line that is specified by the address. The interpretation of the information is shown in FIG. 13, in which the upper three partial ranges show the interpretation for the mode="0" and a data rate of 8 Mbit/s, 4 Mbit/s, and 2 Mbit/s, respectively, and in the lower portion the interpretation of the information for the mode="1" is shown.

The terms used in FIG. 13 are explained as follows:

Mode:
"0": bit switching is turned on; the bit to be switched is transmitted by the input RAM IR;
"1": bit switching is turned off; the bit to be switched is transmitted by the switching RAM SR.

PCM input line:
With this, a PCM input line is designed by numbers.

PCM bit number:
This designates one bit in a PCM frame; the range depends on the input data rate of the corresponding PCM input line.

ENI (enable pattern insertion)
"0": pattern insertion is turned off; output line is in the tristate condition
"1": pattern insertion is turned on;

VAL (pattern value)
Pattern {"0", "1"}should be inserted, instead of bit switching.

At mode="0", the bits 13–10 are reserved for the number of the PCM input line. At a data rate of 8 Mbit/s, the 10 bits 9–0 are used for the PCM bit number. At a data rate of 4Mbit/s, only the nine bits 8–0 are needed for the PCM bit number, and at a data rate of 2 Mbit/s, only the eight bits 7–0 are needed for the PCM bit number. This is the result of the different bit rate. In mode="1", only the bits 15 are used for designating the mode, and bits 1 and 0 are used for the signals ENI and VAL, respectively.

As has already been noted, the BISON component should be capable of switching bits from any position of the received frame to any arbitrary position of the transmitted frame. Difficulties arise if one bit is to be switched from the end of the received frame to the beginning of the transmitted frame. The data path through the input RAM IR and the switching unit SU required only a few clock pulses, which in most cases is fast enough. In the few cases where there is not enough time for this, a bypass register is available so that bits can be transmitted from the PCM input to the PCM output in only a single clock cycle.

Figure 14:
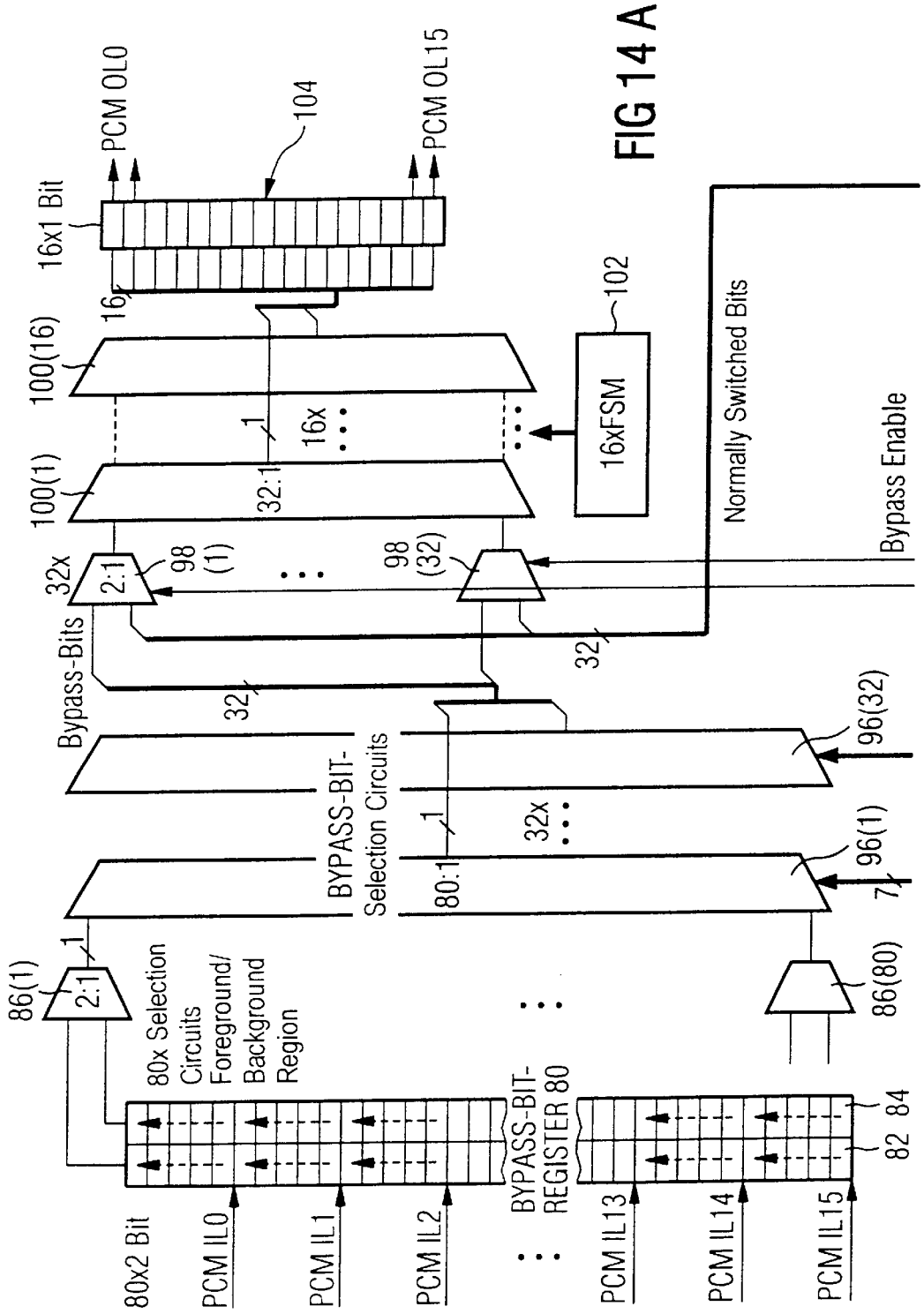
FIGS. 14A and 14B are flow diagrams illustrating the data flow in a bypass mode.
Figure 14:
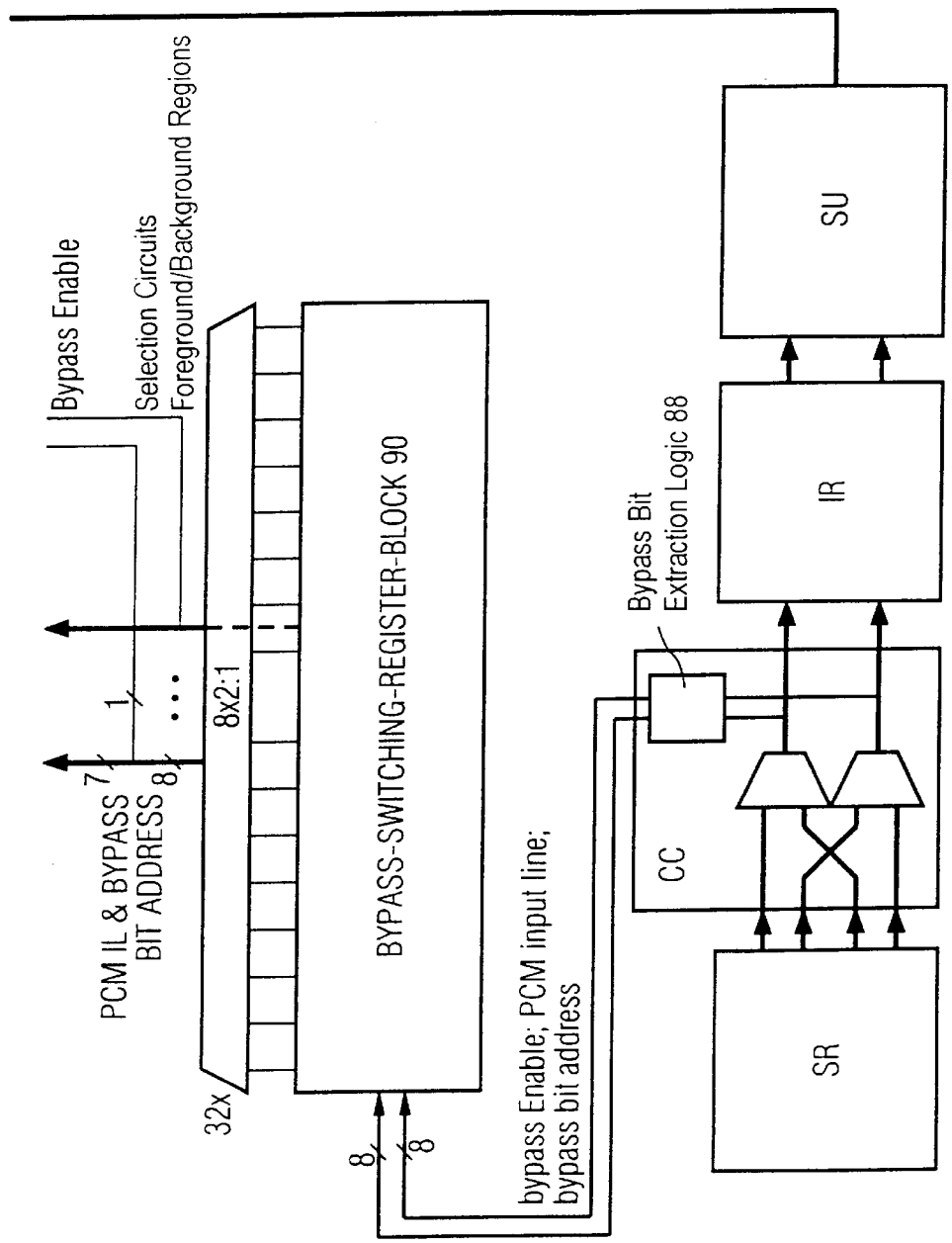

In FIG. 14, it is shown in more detail how the bypass data path already mentioned in conjunction with FIG. 2 is realized. Depending on the data rate of each PCM input line, some bits are written into a bypass bit register 80. The central controller CC controls the access to the bypass bit register 80, by detecting a critical switching information from the switching RAM SR. The control information comprises an item of information via the PCM input line (signal PCM IL), the address of the bypass bit (BIT ADDRESS), and the bypass enable signal (Bypass Enable or EN).

In the normal switching mode, eight or sixteen clock cycles are needed to transmit 16 and 32 bits, respectively. The switching unit SU switches these bits without delay. The input RAM IR is connected to the switching unit SU in order to output these bits by reading out the input RAM IR in the foreground region. The reading access requires two clock cycles: one for address verification, and one for storing the data in the RAM output register for the synchronized operation. For one complete switching cycle, (8+2) and (16+2) clock cycles, respectively, are therefore required.

To furnish the bits for the new PCM frame, the reading access of the input RAM IR must be started at 10 and 18 clock cycles, respectively, before the new PCM frame synchronizing signal PFRAME arrives. At this starting time, the RAM of the background region of the input RAM IR, in which the current PCM data are written, and the RAM of the foreground region of the input RAM IR change places. Access to the following bits in the input RAM IR is therefore not possible, because these bits cannot be written before the switchover to the background region:

1) 8 Mbit/s: bit 1019, 1020, 1021, 1022, 1023
2) 4 Mbit/s: bit 510, 511
3) 2 Mbit/s: bit 255

All of these bits have to be stored in the bypass bit register 80. Two 5-bit shift registers 82, 84 are used as bypass bit registers for each input line, one of the registers being in the form of a foreground register and the other in the form of a background register. The foreground register can be read out while the background register is being written with the next bypass bits of the next PCM frame to arrive. All the register pairs change their places at each new PCM frame. 80 2:1 multiplexers 86(1) through 86(80) select the bits from the instantaneous foreground register for switching via the bypass data path.

The central controller CC receives all the switching information from the switching RAM SR. Two multiplexers in the central controller CC furnish the addresses (switching information) for the input RAM IR. At each clock cycle, a bypass bit extraction logic 88 in the central controller CC passes the bypass switching information from the two switching information streams on to the outputs of the multiplexers. The extracted information from each stream contains eight bits: one bypass imposition bit, four PCM input line bits, and three bits, for addressing the five bypass bits. Two switch 16 bits within eight clock cycles (32 MBit/s throughput, 16 MHz clock speed), 16×8 bits of bypass switching information must be stored in a bypass switching register block 90. If 32 bits have to be switched (64 Mbit/s throughput, 32 MHz clock speed), then 32×8 bits must be stored in 16 clock cycles.

The bypass switching register block 90 likewise has foreground register blocks and background register blocks, which are read out via 32 corresponding 8×2:1 multiplexers 98(1) through 98(32), whose outputs lead to bypass bit selection circuits 98(j), where j=1, . . . , 32. FIG. 14 illustrates the case where the system is configured for 64 Mbit/s throughput at 32 MHz clock speed. However, the figures will also be given below for the case where the configuration is 32 Mbit/s at 16 MHz, by referring to the corresponding number of clock cycles and circuits.

Upon access to the five bypass bits during eight or 16 clock cycles (16 or 32 MHz, as applicable), the new bypass switching information must not overwrite the current information; that is, the foreground register block is read, and the background register block is written at the same time. The register blocks change places after each eight or 16 clock cycles, as applicable. The foreground register 92 that is read out receives its information during eight or 16 cycles, respectively, and outputs this information simultaneously to all 16 or 32 bypass bit selection circuits 96(j), where j=1, . . . , 32. The bypass bit selection circuits 98 are 80:1 multiplexers. Therefore all the bypass bits that must be switched are selected during 8 or 16 clock cycles, respectively. The bypass bit selection circuits 96(j) include 80:1 multiplexers. These unused inputs are selected in order to avoid an address logic for the selection circuits. A bypass bit selection address comprises seven its (four bits for the PCM input line and three bits for the bypass bit address).

The bits that are to be switched via the bypass data path are selected by a "bypass enable" bit, which is delivered to one of 32 2:1 multiplexers 98(j), where j=1, . . . , 32. From the outputs of the multiplexers 98(j), one bypass bit each for the respective output line in the output line block 104 is selected in a register block 100(k), where k=1, . . . , 16, and which block comprises 16 32:1 multiplexers. The selection is made with the aid of 16 finite state automatic devices 102(k), where k=1, . . . , 16. If the 2:1 multiplexers 98(j) are not acted upon by the "bypass enable bit," then the bits switched by the switching unit SU are passed on via the registers 100(k) to the output line block (104) and are then available as output signals PCM OL0 through PCM OL15.

It can be learned from the above description that a BISON component in accordance with the exemplary embodiment has 16 input lines, and the data to be transmitted can be switched to 16 output lines. If more input and output lines and/or a higher throughput is sought, then a plurality of BISON components can be combined into one virtual BISON component.

Figure 15:
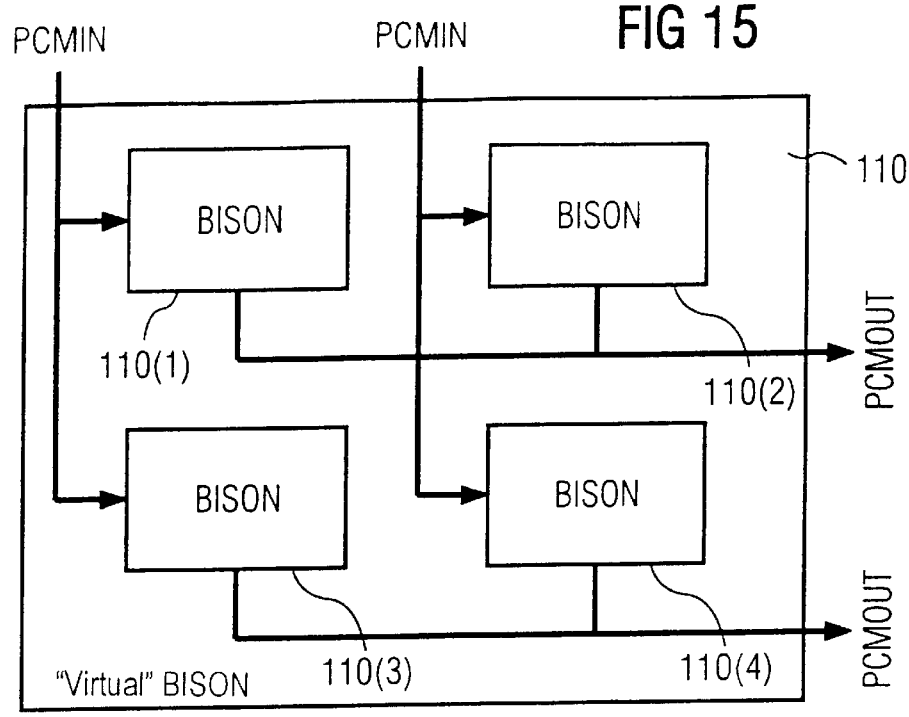
FIG. 15 is a block diagram of a virtual BISON component with four individual BISON components.

In FIG. 15, an example of a virtual BISON component 110 is shown that has more input and output lines and an increased throughput. The virtual BISON component 110 has a field of 32 input and output lines PCM IN and PCM OUT. The throughput per 16 output lines has doubled, because two individual BISON components, instead of a single BISON component, supply data to 16 output lines. The connection of two or more BISON components to the same output lines is made possible by means of outputs that allow a tristate condition. Each output has its own dedicated period for sending data to the output lines. The four BISON components 110(1) through 110(4) of the virtual BISON component 110 are connected as follows: The inputs PCM IN are carried to the inputs of the BISON components 110(1) and 110(3), while the inputs PCM IN are carried to the inputs of the BISON component 110(2) and 110(4). The outputs of the BISON components 110(1) and 110(2) are carried to the outputs PCM OUT, while the outputs of the BISON components 110(3) and 110(4) are carried to the outputs PCM OUT.

Figure 16:
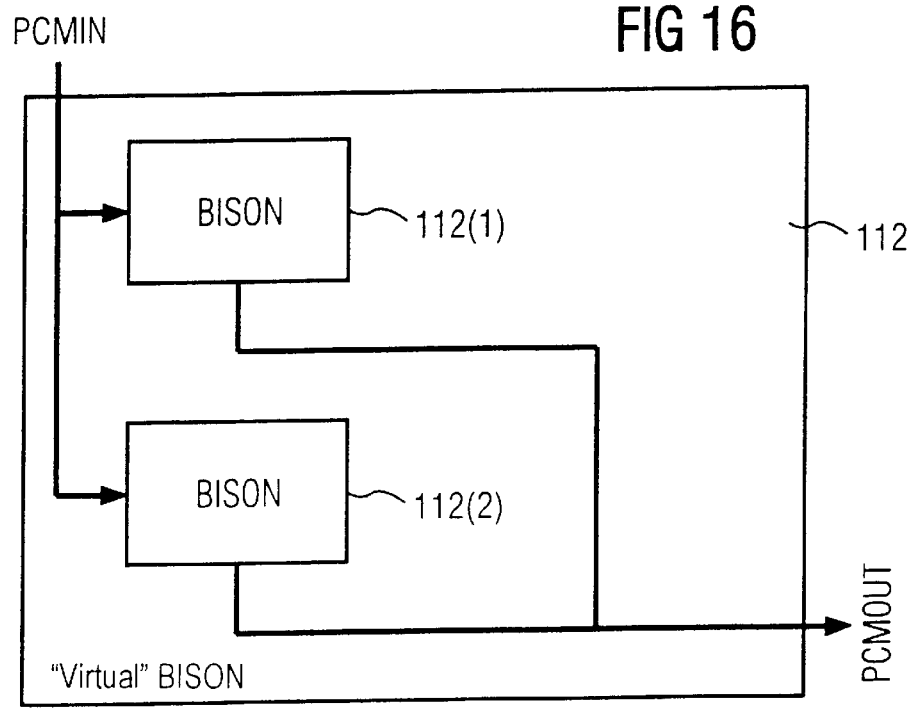
FIG. 16 is a block diagram of a virtual BISON component with two individual BISON components with doubling of the throughput.

FIG. 16 shows an example in which a virtual BISON component 112 is constructed from two individual BISON components 112(1) and 112(2). The virtual BISON component 112 has 16 input and output lines. The throughput per 16 output lines is doubled, because two BISON components supply 16 output lines with data. The input lines PCM IN are connected to the inputs of the BISON components 112(1) and 112(2). The outputs of the two BISON components 112(1) and 112(2) are carried to the output lines PCM OUT.

FIG. 17 shows a further exemplary embodiment for a virtual BISON component 114 with two individual BISON components 114(1) and 114(2). This virtual BISON component 114 has 32 input and output lines. Compared with an individual BISON component, the throughput per 16 output lines is unchanged, because one BISON component supplies data to 16 output lines. The total throughput is doubled, because the virtual BISON component comprises two individual BISON components. The input lines PCM IN are carried to the input lines of the BISON component 114(2), and the input lines PCM IN are carried to the inputs of the BISON component 114(1). The outputs of the BISON component 114(1) are carried to the outputs PCM OUT, and the outputs of the BISON component 114(2) are carried to the outputs PCM OUT. In this arrangement, however, a certain restriction upon switching ensues, since data are for instance not switched from the input line PCM IN (7) to the output line PCM OUT (19). If that is desired, then the exemplary embodiment of FIG. 15 should be used.

We claim:

1. A method of switching frame-oriented serial data, which comprises:

reading at least a first portion of the serial data into an input RAM via an interface;

reading the data from the input RAM into a switching unit;

controlling a read/write operation of the input RAM with a central controller;

generating switching information with the central controller according to a switching algorithm, whereby the switching information is related to the data bit by bit and includes addresses of output lines of the interface;

storing the switching algorithm in a switching RAM;

controlling a switching unit with a control signal and controlling the switching information with the central controller;

switching the data with the switching unit bit by bit to the output lines of the interface in accordance with the switching information;

generating a starting address by an address mapping algorithm via a reading table from a number of a respective output lines;

generating an intermediate data set from an offset address via a control data set, for taking into account different data rates;

linking the intermediate data set and the starting address together, and transposing starting bits of the data set generated in the linking step, such that the switching information for the bits of one output line are distributed to non-cohesive cells of the switching RAM, so that in quasi-sequential processing of the switching RAM, the bits are read out of the input RAM in an order in which they are chronologically required for each output line; and outputting the data via the interface.

2. The method according to claim 1, wherein the generating step comprises generating in the switching information, in addition to the addresses of the output lines, a bit-referred chronological order of a data output.

3. The method according to claim 1, which comprises performing a readout of the switching information, a readout of the data from the input RAM, and switching of the data in the switching unit in parallel operation.

4. The method according to claim 1, which comprises defining a bypass data path in the interface and carrying a second portion of the data directly from the input of the interface to the output lines under control of the central controller via the bypass data path in the interface.

5. The method according to claim 4, which comprises switching single bits or a plurality of cohesive bits of the second portion of the data from an end region of an input frame to a front region at a beginning of an output frame to be output.

6. The method according to claim 1, wherein the interface is a PCM interface, and the method comprises transmitting the frame-oriented serial data in PCM frames.

7. The method according to claim 1, which comprises reading the data from the interface into a background region of the input RAM, while the data from a foreground region of the input RAM are read out into the switching unit, and transposing the foreground and background regions after a frame has been processed.

8. The method according to claim 1, which comprises writing the data switched by the switching unit into a background region of an output register, while the data from the foreground region are output to the output lines.

9. The method according to claim 1, which comprises, in the switching unit, switching at least two bits in parallel and storing the at least two bits.

10. The method according to claim 1, wherein the linking step comprises adding the intermediate data set and the starting address.

11. The method according to claim 1, wherein the quasi-sequential processing comprises reading out equidistant cells of the switching RAM in succession.

12. The method according to claim 1, which comprises selecting a data rate to be processed in a frame of the switching algorithm, and configuring an equal data rate on all the output lines or different data rates on individual output lines or groups of output lines.

13. An apparatus for switching frame-oriented serial data, which comprises:

a plurality of output lines;

an input RAM;

a PCM interface connected to said output lines and to said input RAM, said PCM interface reading a first portion of the serial data into said input RAM and outputting the data to said output lines;

a switching unit connected between said input RAM and said output lines, said switching unit receiving the data, from said input RAM, switching the data bit by bit, and outputting the data to said output lines;

a central controller connected to said input RAM and to said switching unit, said central controller generating switching information with a switching algorithm wherein the switching information is referred to the data bit by bit and includes addresses of said output lines, and said central controller controlling a read/write operation of the input RAM and controlling said switching unit by means of a control signal and the switching information;

means for reading the data from the interface into a background region of the input RAM while the data from a foreground region of the input RAM are read out into the switching unit, and means for transposing the foreground and background regions after a frame has been processed;

a common PCM clock and frame signal for synchronizing the reading in and outputting of the data, and said PCM interface outputting the data;

means for generating a starting address by an address mapping algorithm via a reading table from a number of a respective output lines;

means for generating an intermediate data set from an offset address via a control data set, for taking into account different data rates; and means for linking the intermediate data set and the starting address together, and transposing starting bits of the data set generated in the linking step for distributing the switching information for the bits of one output line to non-cohesive cells of the switching RAM, causing the bits to be read out of the input RAM in an order being chronologically required for each output line in quasi-sequential processing of the switching RAM.

14. The apparatus according to claim 13, which further comprises a switching RAM for storing an address mapping algorithm, and wherein a readout of the switching information from said switching RAM, a readout of the data from said input RAM, and a switching of the data in said switching unit are effected in parallel mode.

15. The apparatus according to claim 13, wherein said PCM interface has an input register and a bypass data path including a bypass register into which bypass bits are read, under control of said central controller, from said input register of said PCM interface.

16. The apparatus according to claim 15, which further comprises a multiplexer connected downstream of said bypass register, said multiplexer outputting the data of the bypass data path and the data of the first portion of the data to said output lines under control of said central controller.

17. A switching device, comprising at least two apparatus according to claim 13, said at least two apparatus being connected to one another for switching frame-oriented serial data.

18. A method of switching frame-oriented serial data, which comprises:

reading at least a first portion of the serial data into an input RAM via an interface;

reading the data from the input RAM into a switching unit;

controlling a read/write operation of the input RAM with a central controller;

generating switching information with the central controller according to a switching algorithm, whereby the switching information is related to the data bit by bit and includes addresses of output lines of the interface;

controlling a switching unit with a control signal and controlling the switching information with the central controller;

switching the data with the switching unit bit by bit to the output lines of the interface in accordance with the switching information;

reading the data from the interface into a background region of the input RAM, while the data from a foreground region of the input RAM are read out into the switching unit, and transposing the foreground and background regions after a frame has been processed;

synchronizing the reading in and outputting of the data by a common PCM clock and frame signal; and outputting the data via the interface.

19. A method of switching frame-oriented serial data, which comprises:

reading at least a first portion of the serial data into an input RAM via an interface;

reading the data from the input RAM into a switching unit;

controlling a read/write operation of the input RAM with a central controller;

generating switching information with the central controller according to a switching algorithm, whereby the switching information is related to the data bit by bit and includes addresses of output lines of the interface;

controlling a switching unit with a control signal and controlling the switching information with the central controller;

switching the data with the switching unit bit by bit to the output lines of the interface in accordance with the switching information;

defining a bypass data path in the interface and carrying a second portion of the data directly from the input of the interface to the output lines under control of the central controller via the bypass data path in the interface; and outputting the data via the interface.

* * * * *